United States Patent
Miyamoto

(10) Patent No.: US 7,009,937 B2
(45) Date of Patent: Mar. 7, 2006

(54) TRANSMISSION QUEUE MANAGING SYSTEM CAPABLE OF EFFICIENTLY CONTROLLING TRAFFIC CONGESTION

(75) Inventor: Rei Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 907 days.

(21) Appl. No.: 09/897,881

(22) Filed: Jul. 5, 2001

(65) Prior Publication Data

US 2002/0003777 A1 Jan. 10, 2002

(30) Foreign Application Priority Data

Jul. 5, 2000 (JP) .................................. 2000-203004

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04L 1/00 | (2006.01) |

(52) U.S. Cl. .................. 370/229; 370/389; 370/412
(58) Field of Classification Search ............ 370/395.71, 370/396, 392, 378, 377, 236, 235, 389, 412, 370/395.21, 395.4, 395.42, 395.41, 395.5, 370/398, 230, 231, 229, 232, 233, 234, 230.1, 370/395.1, 902, 905, 94.1, 395, 428, 429, 370/400, 410, 413, 415, 417, 242, 253; 709/245, 709/230, 236, 238
See application file for complete search history.

(56) References Cited

U.S. PATENT DOCUMENTS

| | | | | |
|---|---|---|---|---|
| 5,280,483 A | * | 1/1994 | Kamoi et al. ............... | 370/234 |
| 5,822,540 A | * | 10/1998 | Caldara et al. ............. | 709/236 |
| 5,892,762 A | * | 4/1999 | Okuda et al. .......... | 370/395.42 |
| 6,185,214 B1 | * | 2/2001 | Schwartz et al. ........... | 370/401 |
| 6,304,552 B1 | * | 10/2001 | Chapman et al. ........... | 370/232 |
| 6,611,522 B1 | * | 8/2003 | Zheng et al. .......... | 370/395.21 |
| 6,707,817 B1 | * | 3/2004 | Kadambi et al. ........... | 370/390 |

FOREIGN PATENT DOCUMENTS

| | | |
|---|---|---|
| EP | 0 847 219 | 6/1998 |
| GB | 2 344 974 | 6/2000 |
| JP | 2-190059 | 7/1990 |
| JP | 7-135512 | 5/1995 |
| JP | 9-149040 | 6/1997 |
| JP | A 10-13427 | 1/1998 |
| JP | 10-56458 | 2/1998 |
| JP | A 11-68835 | 1/1999 |
| JP | 11-32078 | 2/1999 |
| JP | B2 2886976 | 2/1999 |
| JP | 11-187031 | 7/1999 |
| JP | A 11-510014 | 8/1999 |
| JP | 11-331257 | 11/1999 |
| JP | 2000-32003 | 1/2000 |

* cited by examiner

Primary Examiner—Ajit Patel
Assistant Examiner—Jamal A. Fox
(74) Attorney, Agent, or Firm—Young & Thompson

(57) ABSTRACT

A retrieving portion compares a header information of a received packet with packet header patterns entered in look-up table of a discarding priority information memorizing portion. The retrieving portion supplies priority information read out from the look-up table on the basis of the comparison result. A discarding priority information adding portion 12 gives high priority to the received packet according to the priority information supplied from the retrieving portion. The discarding priority information adding portion queues the received packet in one of queues. When the number of packets reaches a threshold in each of queues, a collective discarding processing portion collectively discards packets having the high priority.

15 Claims, 9 Drawing Sheets

| NO | PACKET HEADER PATTERN | QUEUE ID | PRIORITY INFO |
|---|---|---|---|
| 1 | TCP PACKET PATTERN | "16A" | "1" |
| 2 | UDP PACKET PATTERN | "16B" | "0" |
|  |  |  |  |
| N | DESTINATION ADDRESS | "16B" | "1" |

FIG. 2

| NO 21 | PACKET HEADER PATTERN 22 | QUEUE ID 23 | PRIORITY INFO. 24 | COUNTED VALUE 81 |
|---|---|---|---|---|
| 1 | | | | |
| 2 | | | | |
| N | | | | |

TRANSMISSION QUEUE MANAGING SYSTEM CAPABLE OF EFFICIENTLY CONTROLLING TRAFFIC CONGESTION

BACKGROUND OF THE INVENTION

This invention relates to a transmission queue managing system used in a packet switch, in particular, to a transmission queue managing system for an output buffered switching system.

As a method for controlling traffic congestion in a packet communication network, a tail-drop method, a random drop on full method, a random early detection (which may be abbreviated to RED) method and the like are well known for the output buffered switching system.

The tail-drop method is a simple method that following packets are dropped or discarded after a transmission queue is fully filled by preceding packets.

The random drop on full method is that some of packets filling a transmission queue are dropped at random when the transmission queue is fully filled by the packets.

The RED method is that following packets are selectively dropped by the use of statistical calculation when the number of preceding packets queued in a transmission queue reaches a predetermined threshold. The probability that each of the following packets is dropped is in proportion to the number of all packets queued in the transmission queue.

However, above-mentioned methods have a common problem that packets are dropped regardless of effect on controlling traffic congestion. That is, these methods can not efficiently control the traffic congestion.

If packets are selected on the basis of their header information to drop them, the traffic congestion will be more efficiently controlled. As methods that header information is referred to drop or discard frames or cells, some methods for providing a plurality of service classes are known.

For example, a frame relay control method is disclosed in Japanese Unexamined Patent Publication No. 11-68835. The frame relay control method prepares two transmission queues in a frame relay switch. One of the transmission queues is a normal queue while the other is a discarding priority queue. When a frame including discarding priority information is received, the frame relay switch stores the frame in the discarding priority queue. The frame relay switch collectively discards all frames stored in the discarding priority queue when congestion is detected in a destination of the frames.

Moreover, Japanese Patent Publication No. 2886976 discloses a service class control method for discarding cells in each class to avoid traffic congestion in an ATM switch. The ATM switch using the method has a plurality of buffer memories corresponding to service classes respectively. Cells received by the ATM switch are stored in the buffer memories according to their service classes represented by their header information. In each of the buffer memories, all cells are discarded when the number of the cells reaches a predetermined threshold.

Furthermore, Japanese Unexamined Patent Publication No. 11-510014 discloses a frame discharging method using a cell loss priority mark. A communication apparatus using the method compares the number of cells stored in a buffer with both of low and high thresholds whenever a cell including an end of file marker is received. If the number of the cells stored in the buffer is equal to or more than the low threshold and smaller than the high threshold, following cells each of which includes the cell loss priority marks are discarded until detection of the next end of file marker. When the number of the cells stored in the buffer is equal to or more than the high threshold, following cells are discarded regardless of the cell loss priority marks until detection of the next end of file marker.

Still furthermore, Japanese Unexamined Patent Publication No. 10-13427 discloses a node which discards cells requesting a specific service class on the basis of both of a connection identifier and a priority.

However, the above-mentioned four methods referring to the header information are not always effective in avoiding or controlling traffic congestion. This is because those methods described above only drops congested packets in an orderly manner or at random, and they are not capable of selectively dropping packets, based on packet header information, which would have most effect on controlling traffic congestion.

SUMMARY OF THE INVENTION

It is therefore an object of this invention to provide a transmission queue managing system which is capable of controlling traffic congestion efficiently.

It is another object of this invention to provide a transmission queue managing system which is independent of quality of service requirements or service classes.

Other object of this invention will become clear as the description proceeds.

According to a first aspect of this invention, a transmission queue managing system is for managing a queue serving packets in a packet switch and comprises a differentiating portion for differentiating a header information of a received packet to produce a differentiated result signal. An adding portion is connected to the differentiating portion and adds a discard priority bit to the received packet in response to the differentiated result signal supplied from the differentiating portion. A buffering memory is connected to the adding portion and memorizes the received packet to which the priority bit is added to join the received packet to the queue. A discarding portion is for collectively discarding packets each of which the priority bit represents high priority from the queue when the number of packets of the queue coincides with a predetermined threshold.

Herein, the differentiating portion comprises an information memorizing portion for memorizing at least one packet header pattern. A retrieving portion is connected to the information memorizing portion and decides whether all or a predetermined part of the header information of the received packet is memorized in the information memorizing portion as the packet header pattern or not to produce the differentiated result signal when all or the predetermined part of the header information coincides with the packet header pattern.

In addition, the information memorizing portion memorizes two or more packet header patterns different from one another and discard priority class information representative of discard priority classes related with said packet header patterns respectively. The differentiated result signal includes the priority class information corresponding to the header pattern which coincides with all or the predetermined part of the header information.

Furthermore, the buffering memory includes multiple queues. The information memorizing portion further memorizes queue ID numbers which assigned to the queues respectively and which related with the packet header patterns respectively. The differentiated result signal includes the ID number corresponding to the header pattern with which all or the predetermined part of the header information coincide. Herein the transmission queue managing system further comprises a queue selecting portion connected between the adding portion and the buffering memory for selecting one of the queues in response to the ID number included in the differentiated result signal.

According to a second aspect of this invention, a method of managing a queue serving packets in a packet switch comprising the steps of differentiating a header information of a received packet to produce a differentiated result signal, adding a discard priority bit to said received packet in response to said differentiated result signal, memorizing said received packet to which said priority bit is added to join said received packet to said queue in a buffer memory, and collectively discarding packets each of which said priority bit represents high priority from said queue when the number of packets of said queue coincides with a predetermined threshold.

BRIEF DESCRIPTION OF THE DRAWING

FIG. 2 shows a look-up table memorized in a discarding priority information memorizing portion used in the transmission queue managing system of FIG. 1;

FIG. 8 shows a look-up table memorized in the discarding priority information memorizing portion used in the transmission queue managing system of FIG. 7.

DESCRIPTION OF THE PREFERRED EMBODIMENTS

Referring to FIGS. 1 through 6, description will be at first directed to a transmission queue managing system according to a first embodiment of this invention. The transmission queue managing system is used in a packet switch adopting an output buffered switching system.

Figure 1:
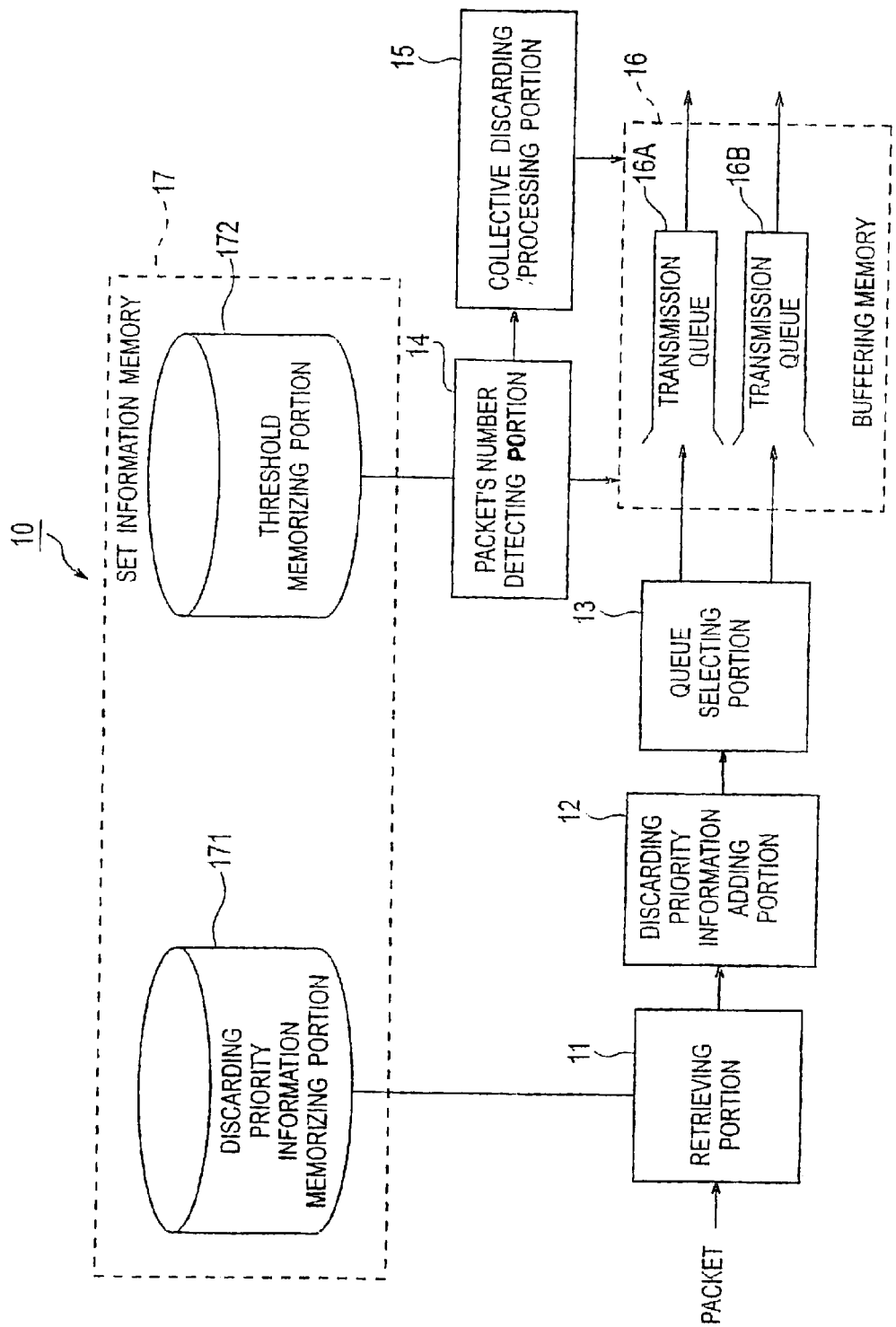
FIG. 1 is a block diagram of a transmission queue managing system according to a first embodiment of this invention.
Figure 3:
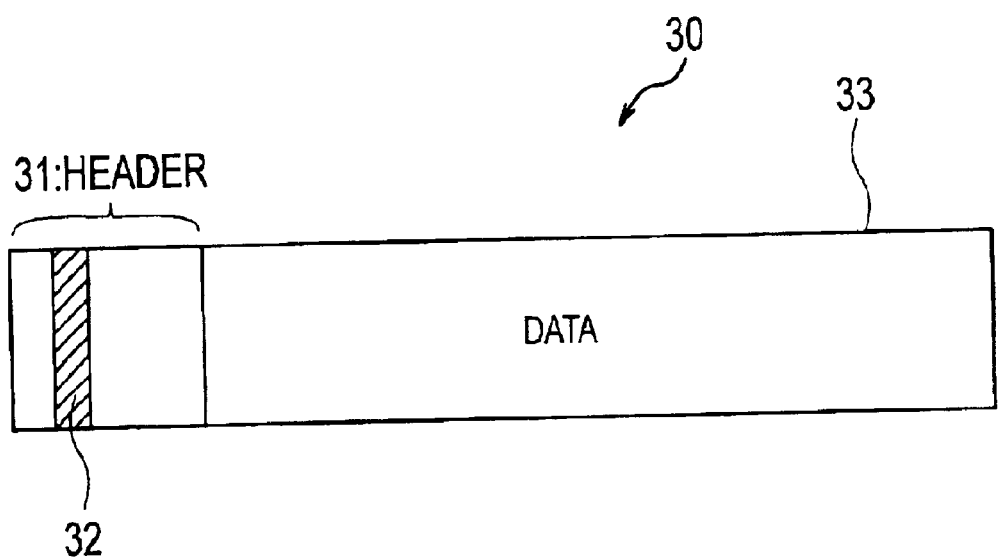
FIG. 3 shows a format of a packet which is received/transmitted by/from the transmission queue managing system of FIG. 1.

In FIG. 1, the transmission queue managing system 10 comprises a retrieving portion 11, a discarding priority information adding portion 12, a queue selecting portion 13, a packet's number detecting portion 14, a collective discarding processing portion 15, a buffering memory 16, and a set information memory 17. The buffering memory 16 includes first and second transmission queues 16A and 16B which are assigned with specific first and second identification (ID) numbers respectively. The set information memory 17 includes a discarding priority information memorizing portion 171 and a threshold memorizing portion 172.

The retrieving portion 11 serves as a differentiating portion together with the discarding priority information memorizing portion 171.

The collective discarding processing portion 15 serves as a discarding portion together with both of the threshold memorizing portion 172 and the packet's number detecting portion 14.

The discarding priority information memorizing portion 171 memorizes a look-up table illustrated in FIG. 2. The look-up table includes an entry number column 21, a packet header pattern column 22, a transmission queue identification (ID) column 23, and a discarding priority information column 24.

In the entry number column 21, consecutive numbers or natural numbers are entered. When the entry number column 21 has N (N: natural number) rows, the consecutive numbers from 1 to N are entered therein. The number of entries entered in the look-up table is equal to N.

In the packet header pattern column 22, at least one packet header pattern is entered. The packet header pattern corresponds all or a predetermined part of header information included in a header part of a packet. For example, the packet header pattern is a bit stream which represents a packet of a certain network protocol or a certain transport protocol, such as a transmission control protocol (TCP), an user datagram protocol (UDP) or the like. Moreover, the packet header pattern may be a bit stream which represents a certain destination address.

In the transmission queue ID column 23, either the first ID number or the second ID number is entered in each row so as to correspond to each packet header pattern entered in the packet header pattern column 22.

In the discarding priority information column 24, either value of "0" or "1" is entered in each row so as to correspond to each packet header pattern entered in the packet header pattern column 22. The value of the discarding priority information represents discarding priority classes different from service classes. The value of "1" is higher than the value of "0" about discarding priority.

An operation of the transmission queue managing system 10 will be mentioned below.

At first, the retrieving portion 11 receives a packet. The packet 30 has a format illustrated in FIG. 3. That is, the format of the packet 30 includes a header part 31 having a specific bit 32 and a data part 33.

The retrieving portion 11 differentiates a header information of the header part 31. That is, the retrieving portion 11 compares the header information with each packet header pattern entered in the packet header pattern column 22. In other words, the retrieving portion 11 retrieves the header information from the look-up table of FIG. 2. When all or a predetermined part of the header information coincides with any packet header pattern, the retrieving portion 11 specifies the entry including the packet header pattern with which all or the part of the header information coincide. Then, the retrieving portion 11 supplies the discarding priority information adding portion 12 with the queue ID number and the discarding priority information of the specified entry together with the received packet.

If the received packet is of TCP protocol, the part of the header information coincides with the TCP packet pattern of the first (or No. 1) entry of FIG. 2. In this case, the retrieving portion 11 specifies the first entry of FIG. 2. Moreover, the retrieving portion 11 supplies the adding portion 12 with the first queue ID number of "16A" and the priority value of "1" of the specified entry.

On the other hand, the retrieving portion 11 merely supplies the received packet to the adding portion 12 when neither all nor the predetermined part of the header information does not coincide with any packet header pattern.

The discarding priority information adding portion 12 adds the discarding priority information to the received packet when the received packet and the discarding priority information are supplied from the retrieving portion 11. More actually, the adding portion 12 gives meaning to the specific bit 32 in response to the discarding priority information. For instance, the adding portion 12 sets the specific bit 32 to "1" when it receives the priority value of "1" as the discarding priority information. Moreover, the adding portion 12 sets the specific bit 32 to "0" when it receives the priority value of "0" as the discarding priority information. When the received packet is received but the discarding priority information is not received, the adding portion 12 sets the specific bit 32 to "0".

The adding portion 12 sends the received packet including the specific bit 32 which is set in "1" or "0" to the queue selecting portion 13 together with the queue ID number sent from the retrieving portion 11. When the queue ID number is not sent from the retrieving portion 11, the adding portion 12 merely supplies the received packet with the specific bit of "1" or "0" to the queue selecting portion 13.

The queue selecting portion 13 sends the received packet with the discarding priority information to either one of the queues 16A and 16B according to the queue ID number sent from the adding portion 12. When the queue ID number of "16A" is received, the queue selecting portion 13 stores the received packet into the first queue 16A. On the other hand, the queue selecting portion 13 stores the received packet into the second queue 16B when the queue ID number of "16B". When the queue ID number does not send from the adding portion 12, the queue selecting portion 13 stores the received packet into one of the queues 16A and 16B on the basis of a predetermined rule.

The first and the second queues 16A and 16B are FIFO-type (first-in first-out type) queues. Each of the queues 16A and 16B memorizes a plurality of packets supplied from the queue selecting portion 13 and outputs the packets in order of storage. Because the buffering memory 16 can be easily realized by using well-known technique, detailed description about it will be omitted.

The packet's number detecting portion 14 periodically detects or monitors the number of the packets stored in each of the queues 16A and 16B. In addition, the packet's number detecting portion 14 compares a first detected number of the packets stored in the first queue 16A with a first threshold memorized in the threshold memorizing portion 172. Similarly, the packet's number detecting portion 14 compares a second detected number of the packets stored in the second queue 16B with a second threshold memorized in the threshold memorizing portion 172. Generally, the first threshold and the second threshold have common value. For example, the common value is equal to ten.

When the first detected number is equal to or more than the first threshold, the packet's number detecting portion 14 notifies the collective discarding processing portion 15 of that. Similarly, when the second detected number is equal to or more than the second threshold, the packet's number detecting portion 14 notifies the collective discarding processing portion 15 of that.

The collective discarding processing portion 15 collectively drops or discards the packets each of which includes the specific bit set to "1" and which queued in the first queue 16A when it receives the notification that the first detected number is equal to or more than the first threshold from the packet's number detecting portion 14. Moreover, the collective discarding processing portion 15 collectively discards the packets each of which includes the specific bit set to "1" and which stored in the second queue 16B when it receives the notification that the second detected number is equal to or more than the second threshold from the packet's number detecting portion 14.

Thus, the transmission queue managing system 10 can selectively discard packets of a specific kind to untie or avoid traffic congestion. For instance, the TCP packets which are expected to untie the traffic congestion can be selectively discarded in communication based on internet protocol. Accordingly, the transmission queue managing system 10 can fine control the congestion.

Moreover, the transmission queue managing system 10 can quickly untie the traffic congestion because it collectively discards plural packets having high discarding priority.

In addition, it is unnecessary to uselessly discard packets which can not be queued into each of the queues 16A and 16B because the transmission queue managing system 10 discards packets having high priority before each of the queues 16A and 16B is filled.

Furthermore, the transmission queue managing system 10 can fine control the congestion because the discarding the packets is carried out when the number of packets queued in each of the queue 16A and 16B.

In addition, the transmission queue managing system 10 can transmits packets without changing order thereof because it gives the discarding priority to the packets on the basis of their header information.

The operation is summarized below with referring to FIGS. 4 to 6.

Figure 4:
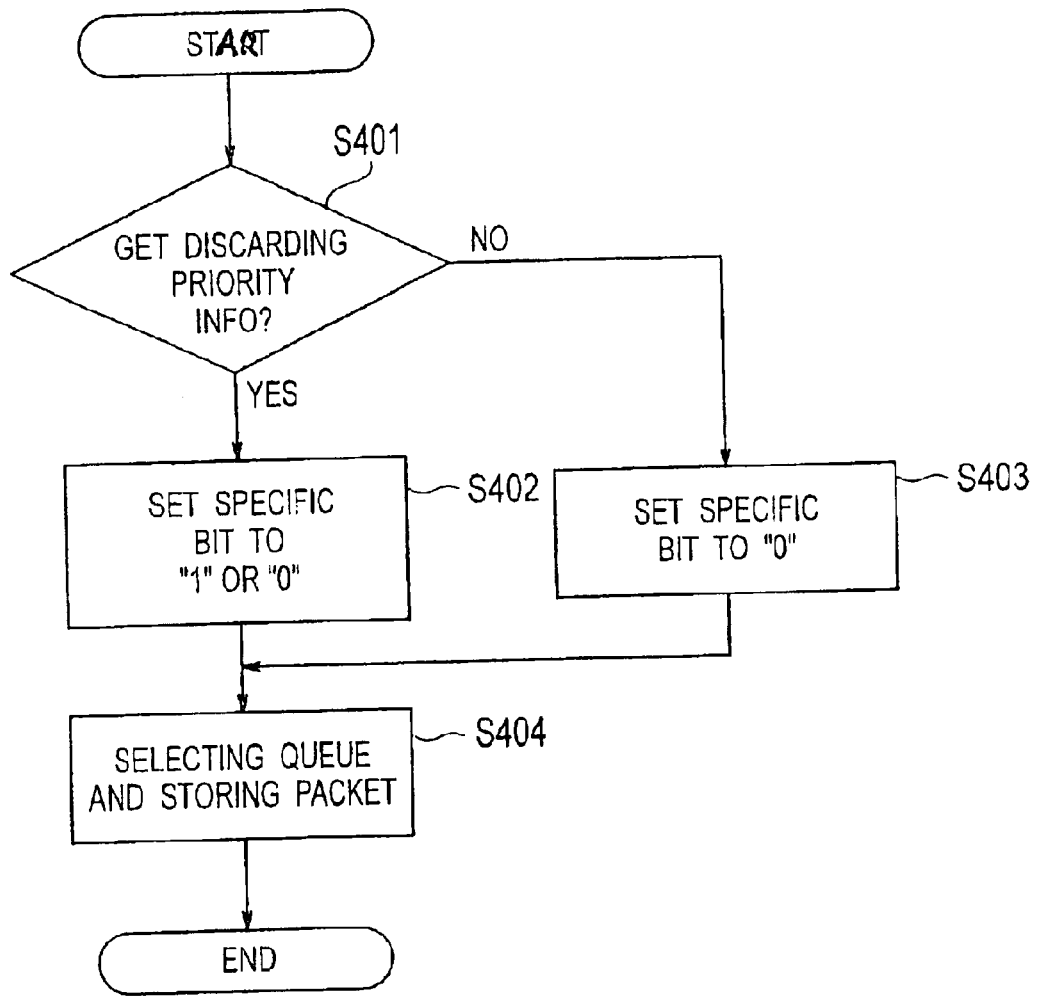
FIG. 4 is a flowchart for describing an operation of a combination of a retrieving portion, a discarding priority information adding portion and a queue selecting portion used in the transmission queue managing system of FIG. 1.

FIG. 4 is a flowchart showing the operation of a combination of the retrieving portion 11, the discarding priority information adding portion 12 and the queue selecting portion 13.

In a step S401 of FIG. 4, the retrieving portion 11 decides whether the priority information corresponding to the received packet can be retrieved from the look-up table memorized in the discarding priority information memorizing portion 171. When all or the predetermined part of the header information of the received packet coincides with any packet header pattern entered in the look-up table, the retrieving portion 11 decides that the discarding priority information corresponding to the received packet can be retrieved or got from the look-up table. On the other hand, when neither all nor the predetermined part of the header information of the received packet does not coincides with any packet header pattern entered in the look-up table, the retrieving portion 11 decides that the discarding priority information corresponding to the received packet can not be retrieved from the look-up table.

When the discarding priority information is got from the look-up table, the discarding priority information adding portion 12 sets the specific bit of the received packet to "1" or "0" according to the discarding priority information (Step S402). That is, the specific bit is set to "1" when the discarding priority information represents the value of "1". The specific bit is set to "0" when the discarding priority information represents the value of "0".

On the other hand, the discarding priority information adding portion 12 sets the specific bit of the received packet to "0" (Step S403) when the discarding priority information is not got from the look-up table.

Next, the queue selecting portion 13 selects one of the queues 16A and 16B according to the queue ID number get from the look-up table by the retrieving portion 11. The queue selecting portion 13 stores the received packet in the selected one of the queues 16A and 16B (Step S404). When the queue ID number is "16A", the received packet stored in the transmission queue 16A. When the queue ID number is "16B", the received packet stored in the transmission queue 16B.

Figure 5:
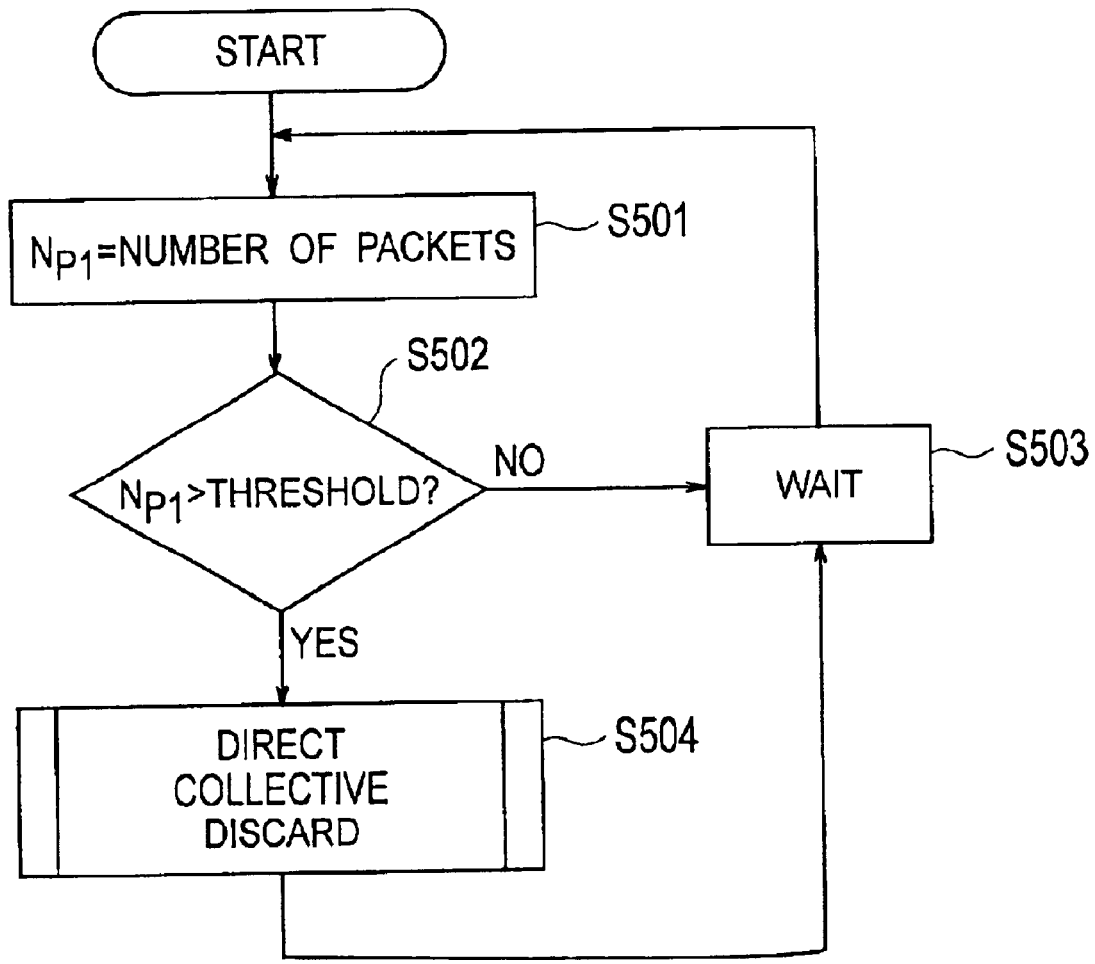
FIG. 5 is a flowchart for describing an operation of a packet's number detecting portion used in the transmission queue managing system of FIG. 1.

FIG. 5 is a flowchart showing the operation of the packet's number detecting portion 14.

The packet's number detecting portion 14 detects the number of the packets stored in each of the queues 16A and 16B. The number of packets is substituted for a variable "$N_{P1}$" (Step S501). Next, the packet's number detecting portion 14 compares the variable "$N_{P1}$" with the predetermined threshold (Step S502). When the variable "$N_{P1}$" is smaller than the threshold, the step S502 returns to the step S501 after an elapse of a predetermined time (Step S503). When the variable "$N_{P1}$" is equal to or more than the threshold, the packet's number detecting portion 14 directs the collective discarding processing portion 15 to collectively discard the packets (Step S504). Subsequently, the step S504 returns to the step S501 through the step S503.

Figure 6:
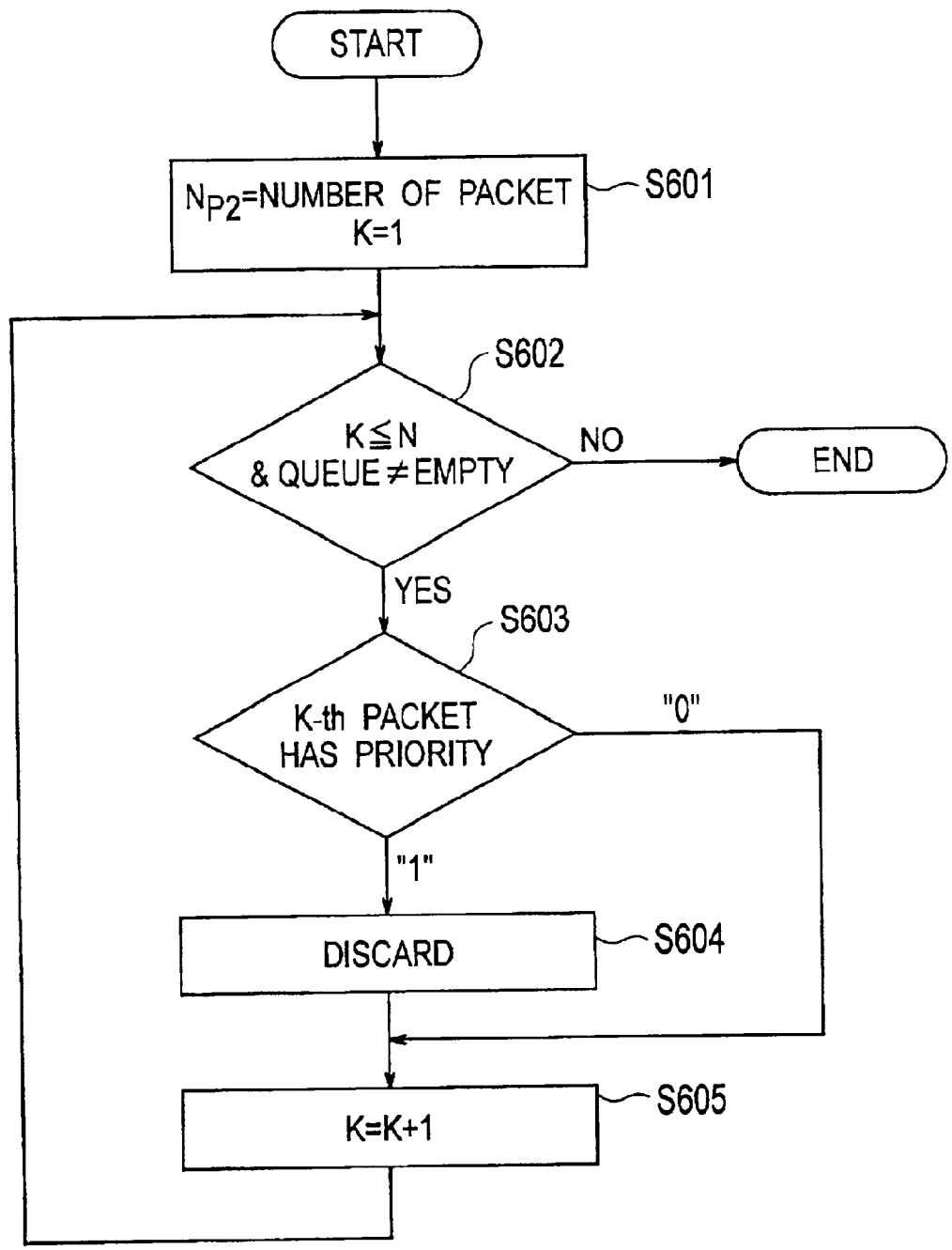
FIG. 6 is a flowchart for describing an operation of a collective discarding processing portion used in the transmission queue managing system of FIG. 1.

FIG. 6 is a flowchart showing the operation of the collective discarding processing portion 15.

The collective discarding processing portion 15 substitutes the number of the packets stored in the queue 16A or 16B, which is the subject of the collective discard, for a variable "$N_{P2}$". In addition, the collective discarding processing portion 15 substitutes "1" for another variable "K" (Step S601).

Next, the collective discarding processing portion 15 compares the variable "$N_{P2}$" with the variable "K" (Step S602). If the variable "K" is larger than the variable "$N_{P2}$", the collective discarding processing portion 15 finishes the operation. In addition, the collective discarding processing portion 15 finishes the operation when the objective queue is empty.

When the queue is not empty and the variable "K" is equal to or smaller than the variable "$N_{P2}$", the collective discarding processing portion 15 judges whether the K-th packet stored in the objective queue includes the specific bit set to "1" (Step S603). When the K-th packet includes the specific bit of "1", the collective discarding processing portion 15 discards the K-th packet from the objective queue (Step S604). Then the collective discarding processing portion 15 substitutes "K+1" for "K". When the K-th packet includes the specific bit of "0", the step S603 jumps to the step S605. Subsequently, the step S605 returns to the step S602.

Figure 7:
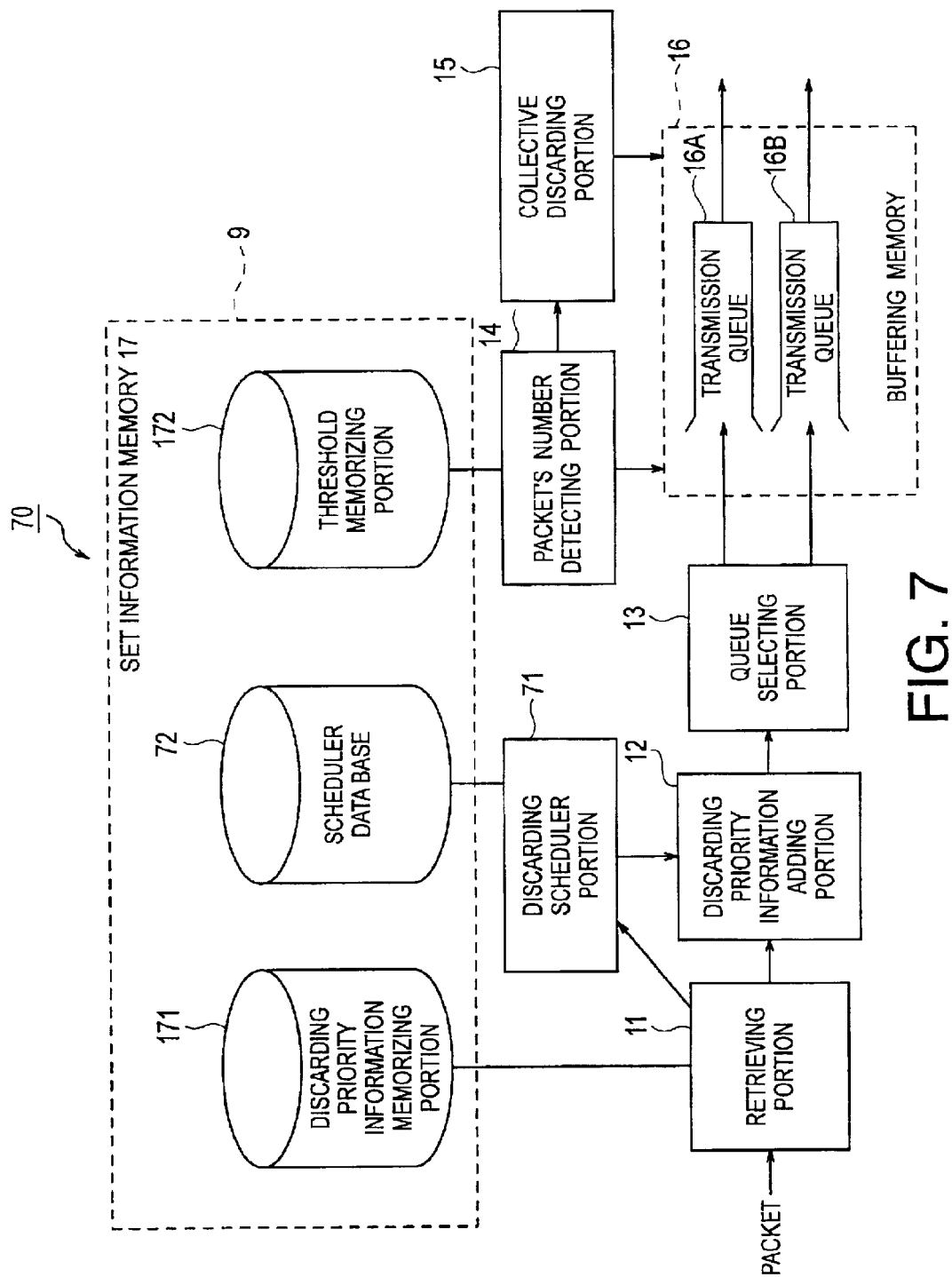
FIG. 7 is a block diagram of a transmission queue managing system according to a second embodiment of this invention.

Referring to FIGS. 7 and 8, the description will proceed to a transmission queue managing system according to a second embodiment of this invention.

As shown in FIG. 7, the transmission queue managing system 70 is similar to that illustrated in FIG. 1 except for a discarding scheduler portion 71 and a scheduler database 72. In addition, the discarding priority information memorizing portion 171 memorizes a look-up table illustrated in FIG. 8. As easily understood from comparison of FIG. 8 with FIG. 2, the look-up table of FIG. 8 includes a counted value column 81.

The retrieving portion 11 operates as that of FIG. 1 except for the following point.

The retrieving portion 11 compares the header information of the received packet with the packet header patterns entered in the look-up table. When all or the predetermined of the header information coincides with any one of the packet header patterns, the retrieving portion 11 rewrites the counted value corresponding to the specified packet header pattern which coincides with the header information so that the counted value increases by one. In other words, the retrieving portion 11 adds one to the counted value corresponding to the specified packet header pattern. Then, the retrieving portion 11 supplies the counted value corresponding to the specified packet header pattern to the discarding scheduler portion 71. Moreover, the retrieving portion 11 notifies the discarding scheduler portion 71 that it receives the packet when the header information is completely different from the packet header patterns.

It is desirable that the counted value represents the number of times the corresponding packet header pattern coincides with the header information for the latest time unit.

The discarding scheduler portion 71 recognizes the number of packets received by the retrieving portion 11 by receiving the counted value and the notification of receiving packets. The discarding scheduler portion 71 calculates the frequency or the proportion of the number of times that the entry corresponding to the specific packet header pattern is used. It is desirable that the frequency or the proportion is based on the latest counted value for the latest time unit. Furthermore, the discarding scheduler portion 71 decides whether the discarding priority is given to the received packet on the basis of comparison the frequency or the proportion with a threshold stored in the scheduler database 72. Thus, the discarding scheduler potion 71 statistically decides whether the discarding priority is given to the received packet and notifies the discarding priority information adding portion 12 of the decision. The threshold may be changed according to a time of the day and/or a day of the week. The scheduler database 72 stores various values for the threshold so as to change the threshold according to a time of the day and/or a day of the week.

The discarding priority information adding portion 12 synthesizes the decision supplied from the discarding scheduler portion 71 and the discarding priority information supplied from the retrieving portion 11 to set the specific bit of the received packet to "1" or "0". For example, even though the discarding priority information represents the value of "0", the discarding priority information adding portion 12 sets the specific bit to "1" when the decision represents that the discarding priority is given to the received packet. Thus, the discarding priority information adding portion 12 sets the specific bit of the received packet to "1" or "0" on the basis of both of the decision supplied from the discarding scheduler portion 71 and the discarding priority information supplied from the retrieving portion 11.

Because the transmission queue managing system 70 has machinery for calculating the frequency of use of each entry entered in the look-up table as mentioned above, transmission rate of packets can be controlled in a communication based on a transport protocol which does not prescribe for control of congestion. To control the transmission rate of packets, the discarding scheduler portion 71 quantitatively gives the discarding priority to the packets.

While this invention has thus far been described in conjunction with a few embodiments thereof, it will readily be possible for those skilled in the art to put this invention into practice in various other manners.

Figure 9:
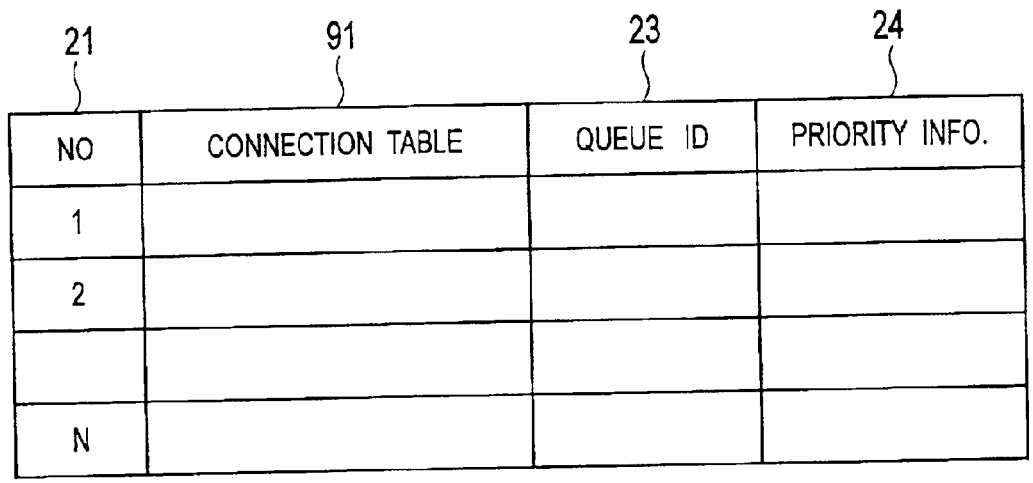
FIG. 9 shows a look-up table memorized in the discarding priority information memorizing portion instead of the look-up table of FIG. 2.

For example, the discarding priority information memorizing portion 171 of FIG. 1 may memorize a look-up table illustrated in FIG. 9 instead of the look-up table of FIG. 2. The look-up table of FIG. 9 includes a connection table column 91 instead of the packet header pattern column 22 of FIG. 2. In the connection table column 91, connection information is entered. The connection information is for an internet protocol communication. The retrieving portion 11 specifies the entry of the look-up table by using a destination address and/or a source address of the header information. The transmission queue managing system including the look-up table of FIG. 9 can prevent a certain connection from monopolizing the queue.

Furthermore, the number of the discarding priority classes may be equal to three or more. The threshold memorizing portion 172 memorizes a plurality of thresholds different from one another to adapt the number of the discarding priority classes. Generally, the number of the thresholds is smaller than the discarding priority classes by one. The transmission queue managing system providing plural discarding priority classes can more fine control the congestion.

In addition, the number of queues may be equal to only one or three or more.

Still furthermore, the look-up table may be used for merely giving high discarding priority to the received packet in a case where the number of the discarding priority classes is equal to two. In this case, the priority information column 24 is unnecessary.

What is claimed is:

1. A transmission queue managing system for managing a queue serving packets in a packet switch, said transmission queue management system comprising:

a differentiating portion for differentiating a header information of a received packet to produce a differentiated result signal, an adding portion connected to said differentiating portion for adding a discard priority bit to said received packet in response to said differentiated result signal supplied from said differentiating portion, a buffering memory connected to said adding portion for memorizing said received packet to which said priority bit is added to join said received packet to said queue, and a discarding portion for collectively discarding packets each of which said priority bit represents high priority from said queue when the number of packets of said queue coincides with a predetermined threshold, wherein said differentiating portion comprises:

an information memorizing portion for memorizing at least one packet header pattern, and a retrieving portion connected to said information memorizing portion for deciding whether all or a predetermined part of said header information of said received packet is memorized in said information memorizing portion as said packet header pattern or not to produce said differentiated result signal when all or said predetermined part of said header information coincides with said packet header pattern, and wherein said packet header pattern is a bit stream that represents one of a network protocol, a transfer protocol and a destination address.

2. A transmission queue managing system as claimed in claim 1, said information memorizing portion memorizing two or more packet header patterns different from one another and discard priority class information representative of discard priority classes related with said packet header patterns respectively, wherein said differentiated result signal includes said priority class information corresponding to the header pattern which coincides with all or said predetermined part of said header information.

3. A transmission queue managing system as claimed in claim 2, said buffering memory includes a plurality of queues, said information memorizing portion further memorizing queue ID numbers which assigned to said queues respectively and which related with said packet header patterns respectively, said differentiated result signal includes the ID number corresponding to the header pattern with which all or said predetermined part of said header information coincide, wherein:

said transmission queue managing system further comprises a queue selecting portion connected between said adding portion and said buffering memory for selecting one of said queues in response to the ID number included in said differentiated result signal.

4. A transmission queue managing system as claimed in claim 2, the number of said discard priority classes being equal to three or more, wherein said discarding portion discards packets in order of height of said priority classes from said queue.

5. A transmission queue managing system as claimed in claim 1, said information memorizing portion memorizing two or more packet header patterns, discard priority class information representative of discard priority classes connected with said packet header patterns, and counted values related with said packet header patterns respectively, wherein said differentiated result signal includes said priority class information and the counted value corresponding to the header pattern which coincides with all or said predetermined part of said header information.

6. A transmission queue managing system as claimed in claim 5, wherein said adding portion adds said discard priority bit to said received packet on the basis of said priority class information and the counted value included in said differentiated result signal.

7. A method of managing a queue serving packets in a packet switch, comprising the steps of:

differentiating a header information of a received packet to produce a differentiated result signal, adding a discard priority bit to said received packet in response to said differentiated result signal, memorizing said received packet to which said priority bit is added to join said received packet to said queue in a buffer memory, and collectively discarding packets each of which said priority bit represents high priority from said queue when the number of packets of said queue coincides with a predetermined threshold, wherein said differentiating step comprises the steps of:

referring an information memorizing portion memorizing at least one packet header pattern, and deciding whether all or a predetermined part of said header information of said received packet is memorized in said information memorizing portion as said packet header pattern or not to produce said differentiated result signal when all or said predetermined part of said header information coincided with said packet header pattern, and wherein said packet header pattern is a bit stream that represents one of a network protocol, a transfer protocol and a destination address.

8. A method as claimed in claim 7, said information memorizing portion memorizing two or more packet header patterns different from one another and discard priority class information representative of discard priority classes related with said packet header patterns respectively, wherein said differentiated result signal includes said priority class information corresponding to the header pattern with which all or said predetermined part of said header information coincide.

9. A method as claimed in claim 8, said buffering memory includes a plurality of queues, said information memorizing portion further memorizing queue ID numbers which assigned to said queues respectively and which related with said packet header patterns respectively, said differentiated result signal includes the ID number corresponding to the header pattern which coincides with all or said predetermined part of said header information, wherein the method further comprise the steps of:

selecting one of said queues in response to the ID number included in said differentiated result signal.

10. A method as claimed in claim 8, the number of said discard priority classes being equal to three or more, wherein said discarding step comprises the step of discarding packets in order of height of said priority classes from said queue.

11. A method as claimed in claim 7, said information memorizing portion memorizing two or more packet header patterns, discard priority class information representative of discard priority classes connected with said packet header patterns, and counted values related with said packet header patterns respectively, wherein said differentiated result signal includes said priority class information and the counted value corresponding to the header pattern with which all or said predetermined part of said header information coincide.

12. A method as claimed in claim 11, wherein said adding step comprises the step of adding said discard priority bit to said received packet on the basis of said priority class information and the counted value included in said differentiated result signal.

13. A transmission queue managing system for managing a queue serving packets in a packet switch, said transmission queue management system comprising:

a differentiating portion for differentiating a packet header pattern of a received packet to produce a differentiated result signal, said packet header pattern being a bit stream that represents one of a network protocol, a transfer protocol and a destination address, an adding portion connected to said differentiating portion for adding a discard priority bit to said received packet in response to said differentiated result signal supplied from said differentiating portion, a buffering memory connected to said adding portion for memorizing said received packet to which said priority bit is added to join said received packet to said queue, and a discarding portion for discarding bits having high priority bits from said queue when a number of packets of said queue exceeds a predetermined threshold, wherein said differentiating portion comprises:

an information memorizing portion for memorizing at least one packet header pattern, and a retrieving portion connected to said information memorizing portion for deciding whether all or a predetermined part of said header information of said received packet is memorized in said information memorizing portion as said header pattern or not to produce said differentiated result signal when all or said predetermined part of said header information coincides with said packet header pattern.

14. The transmission queue managing system as claimed in claim 1, wherein said information memorizing portion comprises a look-up table containing plural ones of said packet header pattern.

15. The method as claimed in claim 7, wherein said information memorizing portion comprises a look-up table containing plural ones of said packet header pattern.

* * * * *